M. R. HUTCHISON.
SPEED DEVICE AND INDICATOR.
APPLICATION FILED NOV. 8, 1909.
1,068,134.
Patented July 22, 1913.
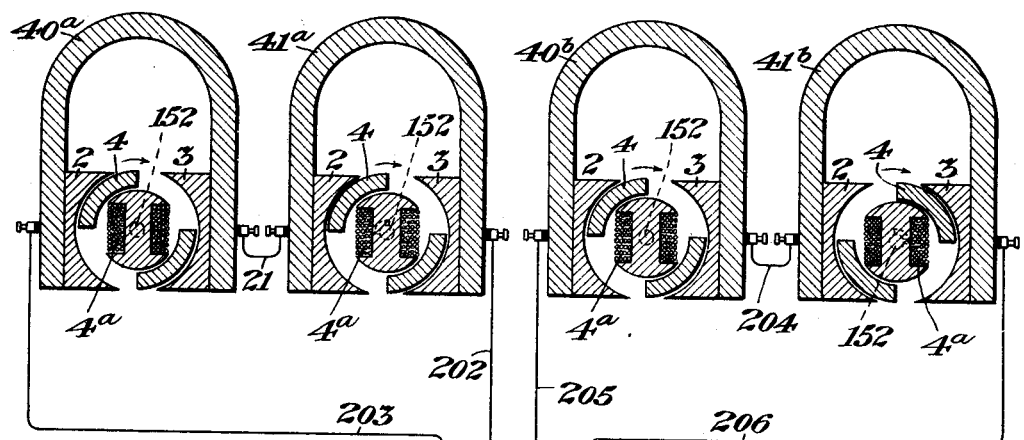
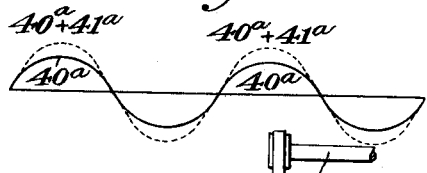
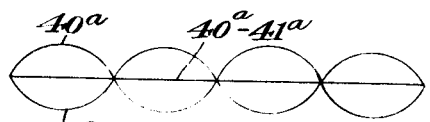
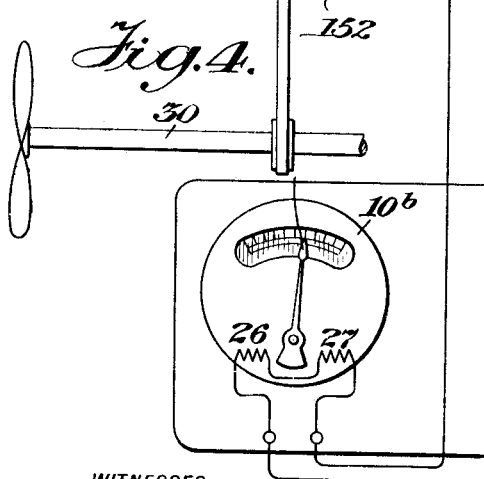
WITNESSES:
INVENTOR
Miller Reese Hutchison
BY
George C. Ileau ATTORNEY

UNITED STATES PATENT OFFICE.

MILLER REESE HUTCHISON, OF SUMMIT, NEW JERSEY, ASSIGNOR TO THE INDUSTRIAL INSTRUMENT COMPANY, OF WATERBURY, CONNECTICUT, A CORPORATION OF CONNECTICUT.

SPEED DEVICE AND INDICATOR.

1,068,134.     Specification of Letters Patent.     Patented July 22, 1913.

Original application filed August 24, 1908, Serial No. 450,059. Divided and this application filed November 8, 1909. Serial No. 526,851.

*To all whom it may concern:*

Be it known that I, MILLER REESE HUTCHISON, a citizen of the United States, and a resident of Summit, in the county of Union and the State of New Jersey, have invented certain new and useful Improvements in Speed Devices and Indicators, of which the following is a specification.

My present invention is a division of my application No. 450,059, filed August 24, 1908, wherein the various features of my invention are set forth at length.

My present invention relates to devices of the above type intended for use on reversible shafts, especially where the work performed when the shaft is rotated in one direction is different in kind or degree from the work done when the shaft is reversed, or where the work done by rotation in one direction tends to undo the work done by rotation in the other direction. A propeller shaft which normally drives the vessel forward but which tends to stop the vessel when reversed is a notable instance of such use. It is characteristic of my speed indicator that the movement of such a shaft is utilized to generate alternating pressures or currents which are used to produce indications. Such alternating pressures or currents have no directional characteristic whereby currents generated by rotation in one direction may be distinguished from those generated by rotation in the other direction, and equal speeds of the reversible propeller or other shaft in either direction will always produce equal indications upon a voltmeter or voltage operating device. Such being the case, an observer looking at the indicator would be informed upon the absence of any indication, or a zero indication being given, that the operation of the shaft had ceased, but upon movement of the indicating means resulting from rotation of the shaft it would be impossible to tell the direction of such shaft rotation. While in some instances the operation above described is of slight importance, yet where the rotation of the shaft in one direction tends to undo the work performed by rotation in the opposite direction, and notably in the case of the propeller shaft of a vessel, such an operation of the indicating means is absolutely to be avoided. For example, it is essential that the captain or pilot of a vessel equipped with an indicating device adapted to denote rotation of the propeller shaft to drive the vessel forward, be absolutely assured that any indication given by such device denotes rotation of the shaft for forward movement, and that he be as absolutely assured that no rotation of the shaft for backward movement will cause any forward indications to be given; absence of indication denoting, absolutely, absence of rotation of the shaft for forward movement. Moreover, it is also essential that it be possible to be informed of the presence or absence of forward rotation of the shaft by observation of a single indicating device, such as one comprising a single hand, pointer or other indicating means, and that an indication when given may be read and understood without the necessity for calculation based upon such indication. In such manner all possibility of error and confusion resulting from a false indication of forward shaft movement, or possibility of wrong interpretation of an indication given is absolutely avoided. Should it be desired, operation of the indicating device for forward rotation of the shaft having been prevented upon reversal of the shaft, other indicating means may be provided whereby the reverse rotation of the shaft is indicated.

My present invention has for its object the provision of certain improvements whereby directionless alternating energy is used to indicate direction, indicating mechanism being operated upon rotation of a reversible propeller or other shaft in one direction, and its operation being prevented upon reversal of the shaft, without the use of a movable contact in the circuit of the indicator, or the checking of the operation of the generator or the use of a movable index coil in the indicator. It also includes improvements whereby a second indicating mechanism may be operated in like manner upon said reverse rotation of the propeller or other shaft, the operation of said second indicating mechanism being prevented upon the forward rotation of the shaft.

The above described principles of my invention and the manner in which they may be embodied in speed indicators will be more fully understood from a detailed description thereof in connection with the accompanying drawings, in which like characters of reference denoting like parts are applied as in the corresponding figures of the drawings of said application No. 450,059.

Figure 1 is a diagrammatic view showing a way in which my invention may be practised. Figs. 2 and 3 show superposed generator voltages. Fig. 4 is a diagrammatic view, showing the connection of the generator shaft to the propeller shaft.

In Fig. 1 a pair of generators $40^a$, $41^a$ are shown, each having pole pieces 2, 3 arranged closely adjacent an inductor 4, consisting essentially of two segmental magnetic screens driven in any suitable manner from the propeller or other shaft 30 whose movements are to be indicated, and rotating about a stationary coil $4^a$. This pair of generators is serially connected at 21, the inductors 4, 4 of each being arranged for continuous equal movements, either forward or reverse, as by mounting on a counter shaft 152. One of the generators, as $40^a$, has its inductor rigidly keyed to the counter shaft, while the other, as $41^a$, has its inductor secured by means of a pin moving in a slot to permit of a circumferential slip through an angle of 90 degrees. Thus upon the rotation of the shaft 30, whose speed is to be indicated, in one direction (the direction of rotation of inductors being as indicated by arrows in $40^a$, $41^a$) the generators are in exact phase, whereas rotation of the shaft in the opposite direction, accompanied by a circumferential slip through an angle of 90 degrees of the inductor of $41^a$, changes the phase of the alternating current produced thereby 180 degrees with respect to the currents generated in $40^a$.

The operation of the device is as follows:—
Upon the operation of the shaft whose speed is to be indicated in one direction, or a forward operation, the generators $40^a$ and $41^a$ being in phase as indicated in the drawing, the voltages are superposed as indicated in Fig. 2 and are applied through circuit 202, 203 to energize the field coils 26 27. As shown, I prefer to use an indicating instrument $10^b$ of the reactive induction type in which there is no movable coil, the index 50 being operated by the reaction of the currents from the field coils on a movable body of metal connected to or forming an extension of the index. The fluctuation of the index thus produced by the voltages of the generators when in phase denotes forward speeds of rotation of the shaft. Upon the reversal of the shaft the generators will be thrown out of phase, and the voltages in the circuit 202, 203, being then neutralized, as indicated in Fig. 3, the index 50 returns to zero, its operation to indicate forward speeds upon reverse rotation of the shaft being prevented. In like manner, a second pair of generators $40^b$ and $41^b$ electrically independent of the generators $40^a$ and $41^a$, and energizing a second indicator $10^b$ through circuit 205, 206 may be arranged, with the inductor of one generator as $41^b$, mounted for a circumferential slip through an angle of 90 degrees in a direction opposite to the slip of the inductor of generator $41^a$. In this manner the generator $40^b$ and $41^b$ will be out of phase upon forward rotation of the shaft whose speed is to be indicated, and the second indicator $10^b$ will be inoperative on such forward rotation. Upon reverse rotation of the shaft whose speed is to be indicated the generators $40^b$ and $41^b$ will be in phase and the index 50 of the second indicator will fluctuate to denote speeds of reversed rotation. Thus I am able to indicate speeds of forward rotation of a propeller or other shaft on one indicating instrument and to prevent false indications upon reversal of the shaft, and may also indicate speeds of reverse rotation and prevent false indications of such reverse rotation upon forward rotation. Moreover, such objects are accomplished without the use of movable switches or movable index coils, or the checking of the operation of the generators producing the alternating voltages or currents. The indicators are calibrated in any desired manner.

While I have herein fully shown and described, and have pointed out in the appended claims certain novel features of construction, arrangement and operation which characterize my invention, it will be understood by those skilled in the art that various omissions, substitutions and changes in the forms, proportions, sizes and details of the device and of its operation may be made without departing from the spirit of my invention.

I claim—

1. A reversible power shaft in combination with two generators for generating electrical pressures of alternating direction, connections from the shaft to said generators for causing said generators to be driven at speeds varying in definite ratio with the speeds of the power shaft, a voltage operated indicator having a movable member and a scale calibrated to give indications proportional to speeds of said power shaft in one direction by deflection of said movable member, said generators being connected to generate currents in a certain phase relation when driven in said direction, connections from said generators to said indicator for actuating said movable member when said generators are driven in such phase relation, and said driving connections being such as to prevent false indications of speeds in said direction by the movable member when the direction of rotation of the power shaft is reversed.

2. A reversible power shaft in combination with two generators for generating electrical pressures of alternating direction, connections from the shaft to said generators for causing said generators to be driven at speeds varying in definite ratio with the speeds of the power shaft, a voltage operated indicator having a movable member and a scale calibrated to give indications proportional to speeds of said power shaft in one direction by deflection of said movable member, said generators being in circuit with said indicator and being arranged to generate pressures in phase to operate said movable member upon rotation of the shaft in said direction, and said connections being such as to prevent false indications of speeds in said direction by the movable member when the direction of rotation of the power shaft is reversed adapted by causing the generators to generate pressures out of phase upon such reversal.

3. A reversible power shaft in combination with two generators for generating electrical pressures of alternating direction, connections from the shaft to said generators for causing the generators to be driven at speeds varying in definite ratio with the speeds of the power shaft, a voltage operated indicator having a movable member and a scale calibrated to give indications proportional to speeds of said power shaft in one direction by deflection of said movable member, said generators being in circuit with said indicator and being arranged to generate pressures in one phase relation to operate said movable member upon rotation of the shaft in said direction, and said connections being such as to prevent false indications of speeds in said direction by the movable member when the direction of rotation of the power shaft is reversed by permitting circumferential slip of the conductor of one generator to cause the generators to generate pressures in another phase relation upon said reversal.

4. A reversible power shaft in combination with two sets of indicating apparatus, each comprising two generators for generating electrical pressures of alternating direction, connections from the shaft to generators for causing said generators to be driven at speeds varying in definite ratio with the speeds of the power shaft, and a voltage operated indicator having a movable member and a scale calibrated to give indications proportional to speeds of said power shaft in one direction by deflection of said movable member, the generators of each set of indicating apparatus being in circuit with the indicator of said set and being adapted to be thrown into and out of a predetermined phase relation one with the other, the generators of one set, upon rotation of the shaft in said direction, being in said predetermined phase relation to cause the movable member of the indicator of that set then to be operated, and the generators of the other set, upon rotation of the shaft in said direction, being then out of their predetermined phase relation to prevent operation of the movable member of the indicator of the second set, and said connections being such as to prevent false indications of speed in said direction by said first indicator when the direction of rotation of the power shaft is reversed.

5. A reversible power shaft in combination with two sets of indicating apparatus, each comprising two generators for generating electrical pressures of alternating direction, connections from the shaft to said generators for causing said generators to be driven at speeds varying in definite ratio with the speeds of the power shaft, and a voltage operated indicator having a movable member and a scale calibrated to give indications proportional to speeds of said power shaft in one direction by deflection of said movable member, the generators of each set of indicating apparatus being in circuit with the indicator of said set and being adapted to be thrown into and out of phase with each other, the generators of one set being in phase with one another, upon rotation of the shaft in said direction, to cause the movable member of the indicator of that set then to be operated, and the generators of the second set upon rotation of the shaft in said direction being then out of phase to prevent false indications by the movable member of the second indicator, and said connections being such as to prevent false indications of speed in said direction by the movable member of the first indicator, when the direction of rotation of the power shaft is reversed, by causing the generators of said first set to generate pressures out of phase upon said reversal.

6. A reversible power shaft in combination with two sets of indicating apparatus, each comprising two generators for generating electrical pressures of alternating direction, connections from the shaft to said generators for causing said generators to be driven at speeds varying in definite ratio with the speeds of the power shaft, and a voltage operated indicator having a movable member and a scale calibrated to give indications proportional to speeds of said power shaft in one direction by deflection of said movable member, the generators of each set of indicating apparatus being in circuit with the indicator of said set and being adapted to be thrown into and out of phase with each other, the generators of one set being in phase with one another, upon rotation of the shaft in said direction, to cause the movable member of the indicator of that set then to be operated, and the generators of the second set upon rotation of the shaft in said direction being then out of phase to prevent false indications by the movable member of the second indicator, said connections being such as to prevent false indications of speed in said direction by the movable member of the first indicator, when the direction of rotation of the power shaft is reversed, by causing the generators of said first set to generate pressures out of phase upon said reversal, and said connections being such as to cause the operation of said second indicator upon said reversal.

7. A reversible power shaft in combination with two sets of indicating apparatus, each comprising two generators for generating electrical pressures of alternating direction, connections from the shaft to said generators for causing said generators to be driven at speeds varying in definite ratio with the speeds of the power shaft, and a voltage operated indicator having a movable member and a scale calibrated to give indications proportional to speeds of said power shaft in one direction by deflection of said movable member, the generators of each set of indicating apparatus being in circuit with the indicator of said set and being adapted to be thrown into and out of phase with each other, the generators of one set being in phase with one another, upon rotation of the shaft in said direction, to cause the movable member of the indicator of that set then to be operated, and the generators of the second set upon rotation of the shaft in said direction being then out of phase to prevent false indications by the movable member of the second indicator, said connections being such as to prevent false indications of speed in said direction by the movable member of the first indicator, when the direction of rotation of the power shaft is reversed, by causing the generators of said first set to generate pressures out of phase upon said reversal, and said connections also being such as to cause operation of said second indicator upon said reversal by causing the generators of said second set then to generate pressures in phase.

Signed at New York city, in the county of New York and State of New York, this 5th day of November A. D., 1909.

MILLER REESE HUTCHISON.

Witnesses:
GEORGE C. DEAN,
IRVING M. OBRIEGHT.

Copies of this patent may be obtained for five cents each, by addressing the "Commissioner of Patents, Washington, D. C."